United States Patent
Nagasaka et al.

(10) Patent No.: US 12,111,627 B2
(45) Date of Patent: Oct. 8, 2024

(54) ARITHMETIC OPERATION DEVICE, PLANT, ARITHMETIC OPERATION METHOD AND PROGRAM

(71) Applicant: Mitsubishi Power, Ltd., Kanagawa (JP)

(72) Inventors: Wataru Nagasaka, Kanagawa (JP); Masayuki Murakami, Kanagawa (JP); Itaru Endo, Kanagawa (JP); Naoyuki Nagafuchi, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 397 days.

(21) Appl. No.: 17/618,096

(22) PCT Filed: Jun. 26, 2020

(86) PCT No.: PCT/JP2020/025140
§ 371 (c)(1),
(2) Date: Dec. 10, 2021

(87) PCT Pub. No.: WO2020/262578
PCT Pub. Date: Dec. 30, 2020

(65) Prior Publication Data
US 2022/0326674 A1   Oct. 13, 2022

(30) Foreign Application Priority Data

Jun. 27, 2019   (JP) .................................. 2019-119584

(51) Int. Cl.
G05B 19/042   (2006.01)
G06Q 10/20   (2023.01)

(52) U.S. Cl.
CPC ......... *G05B 19/0428* (2013.01); *G06Q 10/20* (2013.01); *G05B 2219/2639* (2013.01)

(58) Field of Classification Search
CPC ............................................... G05B 19/0428
(Continued)

(56) References Cited

U.S. PATENT DOCUMENTS

2002/0123870 A1*   9/2002   Chan .................. G05B 23/0294
                                                                    703/7
2002/0156662 A1*  10/2002   Christensen ....... G05B 23/0294
                                                                    700/286
(Continued)

FOREIGN PATENT DOCUMENTS

| JP | 2014-96025   | 5/2014 |
| JP | 2014-106627  | 6/2014 |

(Continued)

OTHER PUBLICATIONS

International Search Report issued on Sep. 24, 2020 in corresponding International (PCT) Patent Application No. PCT/JP2020/025140, with English language translation.
(Continued)

*Primary Examiner* — Jigneshkumar C Patel
(74) *Attorney, Agent, or Firm* — WENDEROTH, LIND & PONACK, L.L.P.

(57) ABSTRACT

An arithmetic operation device includes a performance calculation unit that is configured to calculate performance of a plant before introduction of a part and the performance of the plant after the introduction of the part for each of combinations of a plurality of loads in the plant and a plurality of atmospheric temperatures around the plant, a storage unit that is configured to store a data table indicating a percentage of an operating time of the plant for each of the combinations, and a performance improvement calculation unit that is configured to calculate, on the basis of a calculation result in the performance calculation unit and the data table, how much the performance of the plant is improved compared with the performance before the introduction of the part in a case where the part is introduced and the plant is operated at the percentage indicated by the data table.

5 Claims, 3 Drawing Sheets

(58) Field of Classification Search
USPC .......................................................... 700/297
See application file for complete search history.

(56) References Cited

U.S. PATENT DOCUMENTS

| | | | |
|---|---|---|---|
| 2012/0290104 A1* | 11/2012 | Holt | G06Q 10/00 706/14 |
| 2017/0068761 A1 | 3/2017 | Luquist et al. | |
| 2018/0275641 A1 | 9/2018 | Fujii et al. | |
| 2020/0265361 A1 | 8/2020 | Suzuki et al. | |

FOREIGN PATENT DOCUMENTS

| | | |
|---|---|---|
| JP | 2017-68408 | 4/2017 |
| JP | 2018-169759 A | 11/2018 |
| WO | 2006/063250 | 6/2006 |
| WO | 2015/147871 | 10/2015 |

OTHER PUBLICATIONS

Written Opinion issued on Sep. 24, 2020 in corresponding International (PCT) Patent Application No. PCT/JP2020/025140, with English language translation.

* cited by examiner

FIG. 3

TBL1

| ATMOSPHERIC TEMPERATURE (°C) | LOAD (%) | | | | | | |
|---|---|---|---|---|---|---|---|
| | 40~50 | 50~60 | 60~70 | 70~80 | 80~90 | 90~100 | 100 |
| 0~5 | 0 | 0 | 0 | 0 | 0 | 0 | 0 |
| 5~10 | 0 | 5% | 0 | 0 | 0 | 12% | 20% |
| 10~15 | 0 | 13% | 0 | 0 | 0 | 0 | 15% |
| ... | ... | ... | ... | ... | ... | ... | ... |
| 35~40 | 0 | 15% | 0 | 0 | 0 | 0 | 20% |

FIG. 4

TBL2

| ATMOSPHERIC TEMPERATURE (°C) | LOAD (%) | | | | | | |
|---|---|---|---|---|---|---|---|
| | 40~50 | 50~60 | 60~70 | 70~80 | 80~90 | 90~100 | 100 |
| 0~5 | 100% | 100% | 100% | 100% | 100% | 100% | 100% |
| 5~10 | 100% | 101% | 101% | 100% | 99% | 100% | 103% |
| 10~15 | 99% | 101% | 101% | 100% | 100% | 100% | 101% |
| ... | ... | ... | ... | ... | ... | ... | ... |
| 35~40 | 101% | 99% | 101% | 100% | 100% | 100% | 100% |

ARITHMETIC OPERATION DEVICE, PLANT, ARITHMETIC OPERATION METHOD AND PROGRAM

TECHNICAL FIELD

The present invention relates to an arithmetic operation device, a plant, an arithmetic operation method, and a program.

Priority is claimed on Japanese Patent Application No. 2019-119584, filed Jun. 27, 2019, the content of which is incorporated herein by reference.

BACKGROUND ART

In plants that generate electric power (hereinafter referred to as "power plants"), parts (including devices) may be replaced or added.

Patent Literature 1 discloses a technique related to plant upgrade as a related technique.

CITATION LIST

Patent Literature

[Patent Literature 1]
Japanese Unexamined Patent Application, First Publication No. 2014-106627

SUMMARY OF INVENTION

Technical Problem

Incidentally, as parts to be replaced or added in a power plant, there are often a plurality of types differing in performances and prices even though they have the same function. Therefore, there is a need for a technique that makes it possible to quantitatively and easily ascertain how much the performance of a plant will be improved when new parts are introduced compared with the performance before the introduction of the new parts.

An object of the present invention is to provide an arithmetic operation device, a plant, an arithmetic operation method and a program capable of solving the above problems.

Solution to Problem

According to a first aspect of the present invention. an arithmetic operation device is provided, including a performance calculation unit that is configured to calculate performance of a plant before introduction of a part and the performance of the plant after the introduction of the part for each of combinations of a plurality of loads in the plant and a plurality of atmospheric temperatures around the plant; a storage unit that is configured to store a data table indicating a percentage of an operating time of the plant for each of the combinations; and a performance improvement calculation unit that is configured to calculate, on the basis of a calculation result in the performance calculation unit and the data table, how much the performance of the plant is improved compared with the performance before the introduction of the part in a case where the part is introduced and the plant is operated at the percentage indicated by the data table.

In a second aspect of the present invention, the arithmetic operation device according to the first aspect may further include a performance improvement result output unit that is configured to output the calculation result in the performance improvement calculation unit.

According to a third aspect of the present invention, in the arithmetic operation device of the first aspect or the second aspect, the performance of the plant may include at least one of heat rate of the plant, remaining life of the plant, and a reduction amount of gas emitted by the plant.

According to a fourth aspect of the present invention, in the arithmetic operation device of any one of the first aspect to the third aspect, in a case where a plurality of the parts are introduced, the performance calculation unit may calculate the performance of the plant by using a coefficient indicating a degree of influence of a combination of the parts on the performance of the plant.

According to a fifth aspect of the present invention, a plant is provided, including the arithmetic operation device of any one of the first aspect to the fourth aspect; and a power generation device that is configured to supply electric power according to the load.

According to a sixth aspect of the present invention, an arithmetic operation method is provided, including calculating performance of a plant before introduction of a part and the performance of the plant after the introduction of the part for each of combinations of a plurality of loads in the plant and a plurality of atmospheric temperatures around the plant; storing a data table indicating a percentage of an operating time of the plant for each of the combinations; and calculating, on the basis of a calculation result of the performance of the plant and the data table, how much the performance of the plant is improved compared with the performance before the introduction of the part in a case where the part is introduced and the plant is operated at the percentage indicated by the data table.

According to a seventh aspect of the present invention, a program is provided causing a computer to execute calculating performance of a plant before introduction of a part and the performance of the plant after the introduction of the pail for each of combinations of a plurality of loads in the plant and a plurality of atmospheric temperatures around the plant; storing a data table indicating a percentage of an operating time of the plant for each of the combinations; and calculating, on the basis of a calculation result of the performance of the plant and the data table, how much the performance of the plant is improved compared with the performance before the introduction of the part in a case where the part is introduced and the plant is operated at the percentage indicated by the data table.

Advantageous Effects of invention

According to the arithmetic operation device, the plant, the arithmetic operation method, and the program according to the embodiment of the present invention, it is possible to quantitatively and easily ascertain how much the performance of a plant is improved when a new part is introduced compared with the performance before the introduction of the new part.

BRIEF DESCRIPTION OF DRAWINGS

FIG. 3 is a diagram illustrating an example of a data table TBL1 according to the embodiment of the present invention.

FIG. 4 is a diagram illustrating an example of a data table TBL2 according to the embodiment of the present invention.

DESCRIPTION OF EMBODIMENTS

Embodiments

Hereinafter, embodiments will be described in detail with reference to the drawings.

A configuration of a plant 1 according to an embodiment of the present invention will be described.

The plant 1 is a power plant that generates electric power with, for example, a gas turbine combined cycle (GTCC), that is, generates electric power a first time with a gas turbine by using natural gas or the like as a raw material, uses exhaust heat to generate steam, and generates electric power a second time with a steam turbine by using the steam.

Figure 1:
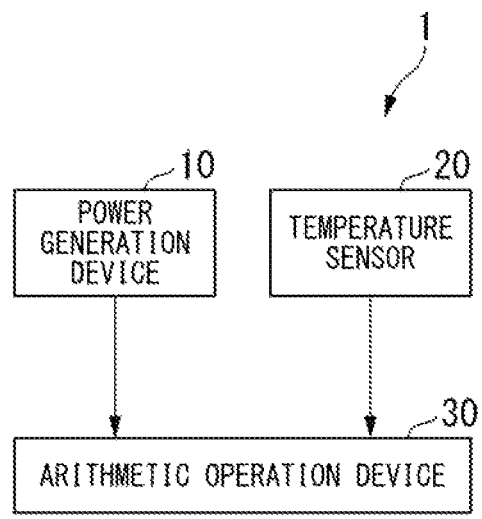
FIG. 1 is a diagram illustrating a configuration of a plant according to an embodiment of the present invention.

As illustrated in FIG. 1. the plant 1 includes a power generation device 10, a temperature sensor 20, and an arithmetic operation device 30.

The power generation device 10 generates electric power with a gas turbine and a steam turbine.

The temperature sensor 20 is provided around the plant 1 and detects the temperature around the plant 1.

The arithmetic operation device 30 is a device that, in a case where the plant 1 is upgraded, that is, a new part (such as a device) is introduced into the plant 1 (in a case where a part is replaced, a new part is added, or the like), calculates how much the performance of the plant 1 is improved compared with the performance before the introduction of the new part. The number of parts to be introduced may be one or a plurality.

Figure 2:
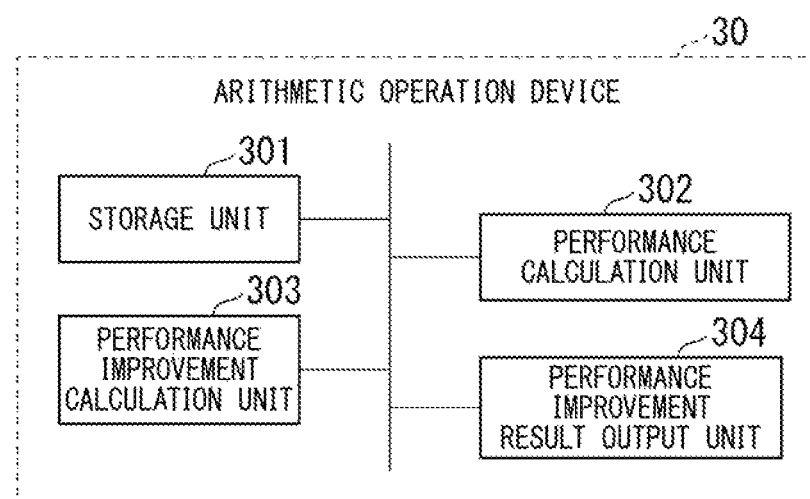
FIG. 2 is a diagram illustrating a configuration of an arithmetic operation device according to the embodiment of the present invention.

As illustrated in FIG. 2, the arithmetic operation device 30 includes a storage unit 301, a performance calculation unit 302. a performance improvement calculation unit 303, and a performance improvement result output unit 304.

The storage unit 301 stores various types of information necessary for a process performed by the arithmetic operation device 30.

For example, the storage unit 301 stores a data table TBL1 illustrated in FIG. 3. The data table TBL 1 indicates a percentage of an operating time of the plant 1 for each of combinations of a plurality of representative loads in the plant 1 and a plurality of representative atmospheric temperatures around the plant 1 during an operation in a predetermined period (for example, an operation schedule for the past year or the next month).

For example, the storage unit 301 stores a data table TBL2 illustrated in FIG. 4. Details of the data table TBI2 will be described later.

For example, the data table TBL I illustrated in FIG. 3 indicates operation results of the plant 1 for the past year. This data table TBL1 indicates that, in the total operating time in the past year, a percentage of the time for which the plant 1 was operated under the conditions that the atmospheric temperature was 5° C. or higher and lower than 10° C. and the load was 50% or higher and lower than 60% of the maximum load was 5%. the percentage of the time for which the plant 1 was operated under the conditions that the atmospheric temperature was 5° C.' or higher and lower than 10° C. and the load was 90% or higher and lower than 100% of the maximum load was 12%, the percentage of the time for which the plant 1 was operated under the conditions that the atmospheric temperature was 5° C. or higher and lower than 10° C. and the load was 100% of the maximum load was 20%, the percentage of the time for which the plant 1 was operated under the conditions that the atmospheric temperature was 10° C. or higher and lower than 15° C. and the load was 50% or higher and lower than 60% of the maximum load was 13%. the percentage of the time for which the plant 1 was operated under the conditions that the atmospheric temperature was 10° C. or higher and lower than 15° C. and the load was 100% of the maximum load was 15%, the percentage of the time for which the plant 1 was operated under the conditions that the atmospheric temperature was 35° C. or higher and 40° C. or lower and the load was 50% or higher and lower than 60% of the maximum load was 15%, and the percentage of the time for which the plant 1 was operated under the conditions that the atmospheric temperature was 35° C. or higher and 40° C. or lower and the load was 100% of the maximum load was 20%.

Representative values may be used for each of the above atmospheric temperatures and loads. For example, as a representative value, 2.5° C. may be used in a case where the atmospheric temperature is 0° C. or higher and lower than 5° C., 7.5° C. may be used in a case where the atmospheric temperature is 5° C. or higher and lower than 10° C. 12.5° C. may he used in a case where the atmospheric temperature is 10° C. or higher and lower than 15° C., and 37.5° C. may be used in a case where the atmospheric temperature is 35° C. or higher and 40° C. or lower. In addition, as a representative value, 45% may be used in a case where the load is 40% or higher and lower than 50% of the maximum load, 55% may be used in a case where the load is 50% or higher and lower than 60% of the maximum load, 65% may be used in a case where the load is 60% or higher and lower than 70% of the maximum load, 75% may be used in a case where the load is 70% or higher and lower than 80% of the maximum load, 85% may be used in a case where the load is 80% or higher and lower than 90% of the maximum load, and 95% may be used in a case where the load is 90% or higher and lower than 100% of the maximum load.

The performance calculation unit 302 calculates the performance of the plant 1 before the introduction of a part and the performance of the plant 1 after the introduction of the part for the same combination as each of the combinations of the plurality of representative loads and the plurality of representative atmospheric temperatures in the data table TBL 1 illustrated in FIG. 3. The performance of the plant 1 here is the heat rate of the plant 1 (including an output power amount and a power generation efficiency), the remaining life of the plant 1, a reduction amount of a gas such as NOx emitted by the plant 1, or the like.

For example, the performance calculation unit 302 prepares a model parameter for each part configuring the plant 1. The performance calculation unit 302 executes a simulation of the performance of the plant 1 for the same combinations as those of the loads and the atmospheric temperatures in the data table TBL1 by using parameters for each part before the introduction of the new part. The performance calculation unit 302 executes simulation of the performance of the plant 1 for the same combinations as those of the loads and the atmospheric temperatures in the data table TBL1 by using parameters for each part after the introduction of the new part.

The performance calculation unit 302 executes simulation of the performance of the plant 1 by using, for example, an application for simulating the performance of the plant 1 (for example, EBSILON (registered trademark) capable of evaluating the performance of various power plants).

The performance improvement calculation unit 303 acquires a simulation result in the performance calculation unit 302. The performance improvement calculation unit 303 calculates a percentage of a simulation result of the performance of the plant 1 using the parameter for each part after the introduction of the new part when a simulation result of the performance of the plant 1 using the parameter for each part before the introduction of the new part is set to 100%. The performance improvement calculation unit 303 records the calculated result in the storage unit 301 as, for example. the data table TBL2 illustrated in FIG. 4. The data table TBL2 indicates how much the performance of the plant 1 is improved compared with the performance before the introduction of a new part in a case where the new part is introduced into the plant 1 for each of combinations of a plurality of representative loads and a plurality of representative atmospheric temperatures around the plant 1 during an operation for a predetermined period (for example, an operation schedule for the past year or the next month).

For example, the data table TBL2 illustrated in FIG. 4 indicates that: in a case where a new part was introduced and the plant 1 was operated under the conditions that the atmospheric temperature was 5° C. or higher and lower than 10° C. and the load was 50% or higher and lower than 60% of the maximum load. the performance of the plant 1 was improved by 1% compared with the performance before the introduction of the part; in a case where the plant 1 was operated under the conditions that the atmospheric temperature was 5° C. or higher and lower than 10° C. and the load was 90% or higher and lower than 100% of the maximum load, the performance of the plant 1 was the same as the performance before the introduction of the part; in a case where the plant 1 was operated under the conditions that the atmospheric temperature was 5° C. or higher and lower than 10° C. and the load was 100% of the maximum load, the performance of the plant 1 was improved by 3% compared with the performance before the introduction of the part; in a case where the plant 1 was operated under the conditions that the atmospheric temperature was 10° C. or higher and lower than 15° C. and the load was 50% or higher and lower than 60% of the maximum load, the performance of the plant 1 was improved by 1% compared with the performance before the introduction of the part; in a case where the plant 1 was operated under the conditions that the atmospheric temperature was 10° C. or higher and lower than 15° C. and the load was 100% of the maximum load, the performance of the plant 1 was improved by 1% compared with the performance before the introduction of the part; in a case where the plant 1 was operated under the conditions that the atmospheric temperature was 35° C. or higher and 40° C. or lower and the load was 50% or higher and lower than 60% of the maximum load, the performance of the plant 1 was reduced by 1% compared with the performance before the introduction of the part; and in a ease where the plant 1 was operated under the conditions that the atmospheric temperature was 35° C. or higher and 40° C. or lower and the load was 100% of the maximum load, the performance of the plant 1 was the same as the performance before the introduction of the part.

The performance improvement calculation unit 303 multiplies the value in the data table TBL1 and the value in the data table TBL2 for each combination of the load and the atmospheric temperature. The performance improvement calculation unit 303 calculates a total sum of the multiplication results.

For example, in the ease of the data table TBL1 illustrated in FIG. 3 and the data table TBL2 illustrated in FIG. 4, the performance improvement calculation unit 303 calculates 0.05·1.01=0.0505 with respect to the conditions that the atmospheric temperature is 5° C. or higher and lower than 10° C. and the load is 50% or higher and lower than 60% of the maximum load. The performance improvement calculation unit 303 calculates 0.12·1.00=0.12 with respect to the conditions that the atmospheric temperature is 5° C. or higher and lower than 10° C. and the load is 90% or higher and lower than 100% of the maximum load. The performance improvement calculation unit 303 calculates 0.20·1.03=0.2060 with respect to the conditions that the atmospheric temperature is 5° C. or higher and lower than 10° C. and the load is 100% of the maximum load. The performance improvement calculation unit 303 calculates 0.13·1.01=0.1313 with respect to the conditions that the atmospheric temperature is 10° C. or higher and lower than 15° C. and the load is 50% or higher and lower than 60% of the maximum load. The performance improvement calculation unit 303 calculates 0.15·1.01=0.1515 with respect to the conditions that the atmospheric temperature is 10° C. or higher and lower than 15° C. and the load is 100% of the maximum load. The performance improvement calculation unit 303 calculates 0.15·0.99=0.1485 with respect to the conditions that the atmospheric temperature is 35° C. or higher and 40° C. or lower and the load is 50% or higher and lower than 60% of the maximum load. The performance improvement calculation unit 303 calculates 0.20·1.00=0.20 with respect to the conditions that the atmospheric temperature is 35° C. or higher and 40° C. or lower and the load is 100% of the maximum load. The performance improvement calculation unit 303 calculates a total sum of these products as 0.0505+0.12+0.2060+0.1313+0.1515+0.1485+0.20=1.0078. That is, in a case where a new part is introduced and the same operation as in the past year is performed, the performance improvement calculation unit 303 calculates the result indicating that the performance of the plant 1 is expected to be able to be improved by 0.78% from the data table TBL1 and the data table TBL2.

The performance improvement result output unit 304 outputs the calculation result in the performance improvement calculation unit 303.

For example, the performance improvement result output unit 304 displays the calculation result in the performance improvement calculation unit 303 on a display device.

The output of the calculation result in the performance improvement calculation unit 303 performed by the performance improvement result output unit 304 is not limited to displaying the calculation result on the display device. For example, the performance improvement result output unit 304 may print out the calculation result in the performance improvement calculation unit 303 as printed matter from a printer. For example. the performance improvement result output unit 304 may output the calculation result in the performance improvement calculation unit 303 by voice from a speaker.

As described above, the performance improvement result output unit 304 notifies a customer of the calculation result in the performance improvement calculation unit 303. In this way, the customer can use the calculation result in the performance improvement calculation unit 303 as a judgment material for introducing a new part. such as judging that it is more profitable to introduce a new part in a case where the profit obtained through the improvement in the performance of the plant 1 is larger than a difference between a case of introducing a new part and a case of introducing the same pail as before the introduction of the new part on the basis of the calculation result in the performance improvement calculation unit 303.

Figure 5:
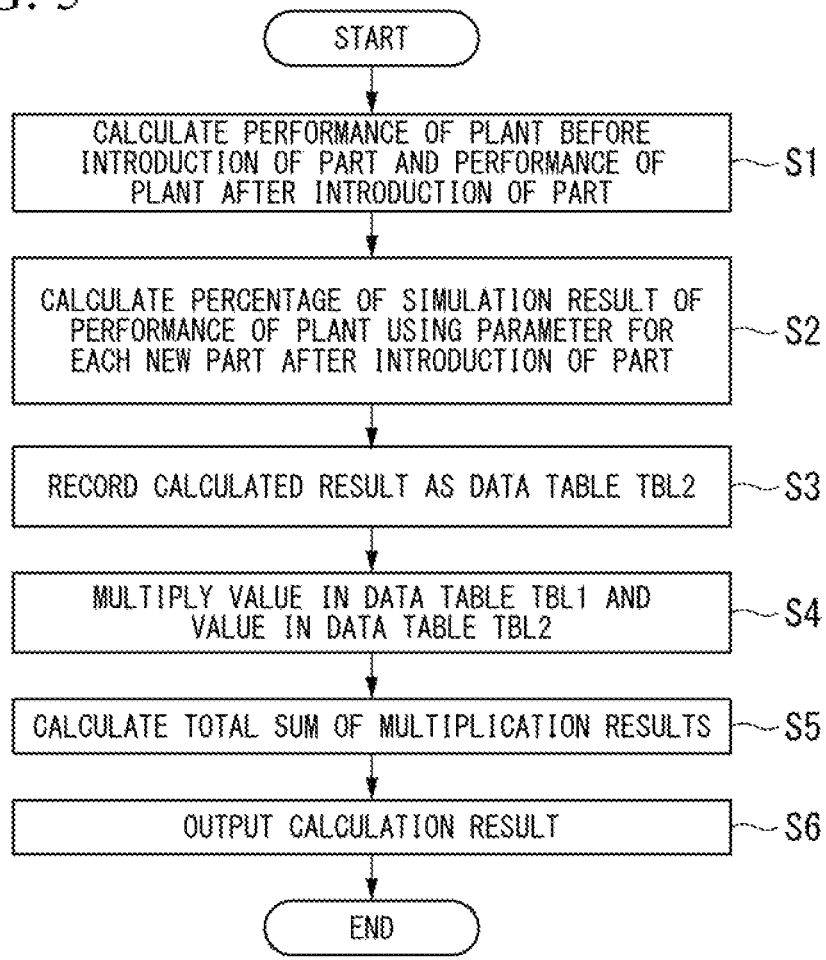
FIG. 5 is a diagram illustrating a processing flow of the plant according to the embodiment of the present invention.

Next, the process of the plant 1 will be described with reference to FIG. 5.

It is assumed that the storage unit 301 stores the data table TBL1.

The performance calculation unit 302 calculates the performance of the plant 1 before the introduction of a part and the performance of the plant 1 after the introduction of the part for the same combination as each of the combinations of the plurality of representative loads and the plurality of representative atmospheric temperatures in the data table TBL1 (step S1).

For example, the performance calculation unit 302 prepares a model parameter for each part configuring the plant 1. The performance calculation unit 302 executes simulation of the performance of the plant 1 for the same combinations as those of the loads and the atmospheric temperatures in the data table TBL1 by using parameters for each new part before the introduction of the part. The performance calculation unit 302 executes simulation of the performance of the plant 1 for the same combinations as those of the loads and the atmospheric temperatures in the data table TBL1 by using parameters for each part after the introduction of the new part.

The performance calculation unit 302 executes simulation of the performance of the plant 1 by using, for example, an application for simulating the performance of the plant 1.

The performance improvement calculation unit 303 acquires a simulation result in the performance calculation unit 302. The performance improvement calculation unit 303 calculates a percentage of a simulation result of the performance of the plant 1 using the parameter for each new part after the introduction of the part with a simulation result of the performance of the plant 1 using the parameter for each part before the introduction of the new part as 100% (step S2). The performance improvement calculation unit 303 records the calculated result in the storage unit 301 as the data table TBL2 (step S3).

The performance improvement calculation unit 303 multiplies the value in the data table TBL1 and the value in the data table 113L2 for each combination of the load and the atmospheric temperature (step S4). The performance improvement calculation unit 303 calculates a total sum of these products (step S5).

The performance improvement result output unit 304 outputs the calculation result in the performance improvement calculation unit 303 (step S6).

For example, the performance improvement result output unit 304 displays the calculation result in the performance improvement calculation unit 303 on a display device.

The plant 1 according to the embodiment of the present invention has been described above.

In the arithmetic operation device 30 of the plant 1, the performance calculation unit 302 calculates the performance of the plant 1 before the introduction of a part and the performance of the plant 1 after the introduction of the part for each of combinations of a plurality of loads in the plant 1 and a plurality of atmospheric temperatures in the plant 1. The storage unit 301 stores a data table indicating an operating percentage of the plant 1 for each of the combinations. The performance improvement calculation unit 303 calculates, on the basis of the calculation result in the performance calculation unit 302 and the data table, how much the performance of the plant 1 is improved compared with the performance before the introduction of a part in a case where the part is introduced and the plant 1 is operated at the percentage indicated by the data table.

In general, the performance improvement in a case of introducing a new part may be obtained by setting actual conditions of the plant, which change from moment to moment, in detail in simulation and performing simulation of transient analysis. Thus, the simulation takes time, and in a case of a large-scale plant. there are many difficulties such as the simulation not converging.

However, in the plant 1 described in the embodiment of the present invention, the arithmetic operation device 30 performs simulation on a plurality of combinations of loads and atmospheric temperatures, and thus it is possible to quantitatively and easily ascertain how much the performance of the plant when a new part is introduced is improved compared with the performance before the introduction of the new part.

It has been described that the plant 1 according to the embodiment of the present invention includes the temperature sensor 20, the temperature sensor 20 detects the temperature around the plant 1, and the arithmetic operation device 30 acquires the temperature detected by the temperature sensor 20. However, there may be a configuration in which the plant 1 according to another embodiment of the present invention does not include the temperature sensor 20. and the arithmetic operation device 30 acquires temperature information around the plant 1 via the Internet such as a weather forecast website.

In the plant 1 according to the embodiment of the present invention, it has been described that the atmospheric temperature has a range of 5° C. and the load has a range of 10% of the maximum load in the data table TBL1 and the data table TBL2. However, ranges in the data table TBL1 and the data table TBL2 are not limited thereto.

In the plant 1 according to the embodiment of the present invention, it has been described that the number of new parts may be one or a plurality, and the arithmetic operation device 30 changes the parameters for all the new parts and calculates the performance of the plant 1.

Regarding the processes according to the embodiment of the present invention, the order of the processes may be changed as long as an appropriate process is performed.

Each of the storage unit 301 and the other storage devices in the embodiment of the present invention may be provided anywhere as long as appropriate information is transmitted and received. Each of the storage unit 301 and the other storage devices may be provided in a plurality of areas and store data in a distributed manner as long as appropriate information is transmitted and received.

Although the embodiment of the present invention has been described. the above-described arithmetic operation device 30 and other control devices may have a computer system inside. The processing procedure is stored in a computer-readable recording medium in the form of a program. and the above process is performed by the computer reading and executing this program. A specific example of a computer will be described below.

Figure 6:
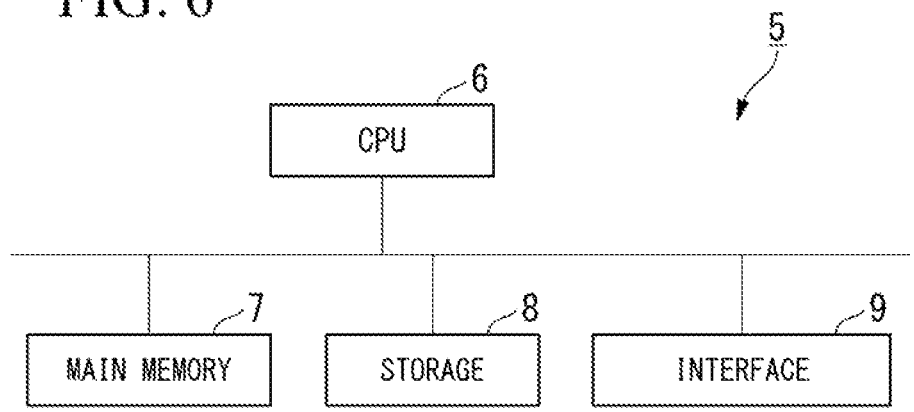
FIG. 6 is a schematic block diagram illustrating a configuration of a computer according to at least one embodiment.

FIG. 6 is a schematic block diagram illustrating a configuration of a computer according to at least one embodiment.

As illustrated in FIG. 6. a computer 5 includes a CPU 6, a main memory 7, a storage 8, and an interface 9.

For example, each of the above arithmetic operation device 30 and other control devices is mounted on the computer 5. The operation of each processing unit described above is stored in the storage 8 in the form of a program. The CPU 6 reads a program from the storage 8, loads the program to the main memory 7, and executes the above process according to the program. The CPU 6 secures a storage area corresponding to each of the above storage units in the main memory 7 according to the program.

Examples of the storage 8 include a hard disk drive (HDD), a solid-state drive (SSD), a magnetic disk, a magnetooptical disk, a compact disc read-only memory (CD-ROM), a digital versatile disc read-only memory (DVD-ROM), and a semiconductor memory. The storage 8 may be an internal medium directly connected to a bus of the computer 5, or an external medium connected to the computer 5 via the interface 9 or a communication line. In a case where this program is distributed to the computer 5 via the communication line, the computer 5 that receives the distributed program may load the program to the main memory 7 and execute the above process. In at least one embodiment, the storage 8 is a non-transitory tangible storage medium.

The above program may realize some of the above functions. The program may be a tile that can realize the above functions in combination with a program already recorded in the computer system, that is, a so-called difference file (difference program).

Although some embodiments of the present invention have been described, these embodiments are examples and do not limit the scope of the invention. Various additions, omissions, replacements, and changes may be made to these embodiments without departing from the concept of the invention.

INDUSTRIAL APPLICABILITY

According to the arithmetic operation device, the plant, the arithmetic operation method, and the program of the embodiment of the present invention, it is possible to quantitatively and easily ascertain how much the performance of a plant when a new part is introduced is improved compared with the performance before the introduction of the new part.

REFERENCE SIGNS LIST

1 Plant
5 Computer
6 CPU
7 Main memory
8 Storage
9 Interface
10 Power generation device
20 Temperature sensor
30 Arithmetic operation device
301 Storage unit
302 Performance calculation unit
303 Performance improvement calculation unit
304 Performance improvement result output unit

The invention claimed is:

1. A plant, comprising:
an arithmetic operation device that includes a computer system,
wherein the computer system includes a memory configured to store instructions; a storage; and a processor configured to execute the instructions to:
calculate performance of the plant before introduction of a part and the performance of the plant after the introduction of the part for each of combinations of a plurality of loads in the plant and a plurality of atmospheric temperatures around the plant;
cause the storage to store a data table indicating a percentage of an operating time of the plant for each of the combinations;
calculate, based on a calculation result in the performance calculation and the data table, how much the performance of the plant is improved compared with the performance before the introduction of the part in a case where the part is introduced and the plant is operated at the percentage indicated by the data table; and
a temperature sensor that is configured to detect the plurality of atmospheric temperatures; and
a power generator that is configured to supply electric power according to a load, wherein a performance of the power generator is changed based on the part included in the plant.

2. The plant according to claim 1, wherein the processor is configured to output the calculation result.

3. The plant according to claim 1,
wherein the performance of the plant includes at least one of heat rate of the plant, remaining life of the plant, and a reduction amount of gas emitted by the plant.

4. The plant according to claim 1,
wherein, in a case where a plurality of the parts are introduced, the processor calculates the performance of the plant by using a coefficient indicating a degree of influence of a combination of the parts on the performance of the plant.

5. A processing method, comprising:
calculating, as a first calculation, performance of a plant before introduction of a part and the performance of the plant after the introduction of the part for each of combinations of a plurality of loads in the plant and a plurality of atmospheric temperatures around the plant, the plurality of atmospheric temperatures being detected by a temperature sensor;
storing a data table indicating a percentage of an operating time of the plant for each of the combinations;
calculating, as a second calculation, based on a calculation result of the first calculation and the data table, how much the performance of the plant is improved compared with the performance before the introduction of the part in a case where the part is introduced and the plant is operated at the percentage indicated by the data table;
replacing a first part with a second part for changing the performance of a power generator, the first part being in the plant, the second part being a part that is determined based on a result of the second calculation and introduced into the plant; and
outputting power from the power generator to a load, the power being in accordance with the load.

* * * * *